United States Patent
Garcia (10) Patent No.: US 6,550,442 B2
(45) Date of Patent: Apr. 22, 2003

(54) ROTARY MACHINE USED AS A FOUR-CYCLE ROTARY COMBUSTION ENGINE, A COMPRESSOR, A VACUUM PUMP, A STEAM ENGINE AND A HIGH PRESSURE WATER MOTOR

(76) Inventor: Modesto J. Garcia, 3269 Clairmont Rd. NE., Atlanta, GA (US) 30329-1017

( * ) Notice: Subject to any disclaimer, the term of this patent is extended or adjusted under 35 U.S.C. 154(b) by 0 days.

(21) Appl. No.: 09/905,820

(22) Filed: Jul. 16, 2001

(65) Prior Publication Data
US 2003/0010312 A1 Jan. 16, 2003

(51) Int. Cl.[7] .............................................. F02B 53/00
(52) U.S. Cl. ...................... 123/243; 123/241; 123/229; 123/236; 418/138
(58) Field of Search .................... 123/229, 236, 123/241, 243, 242; 418/138, 265

(56) References Cited

U.S. PATENT DOCUMENTS

| | | | | |
|---|---|---|---|---|
| 893,801 A | * | 7/1908 | Hidden | 418/138 |
| 993,053 A | * | 5/1911 | Goehst et al. | 418/138 |
| 1,084,635 A | * | 1/1914 | Hoffman | 418/138 |
| 1,319,932 A | * | 10/1919 | Stevenson | 123/229 |
| 1,320,531 A | * | 11/1919 | Carroll | 418/138 |
| 1,342,496 A | * | 6/1920 | Carroll | 418/138 |
| 1,980,726 A | * | 11/1934 | Higbee | 418/138 |
| 2,075,843 A | * | 4/1937 | Gerdau | 418/138 |
| 2,203,449 A | * | 6/1940 | Tips | 123/229 |
| 3,200,796 A | * | 8/1965 | Kraic et al. | 418/138 |
| 3,215,129 A | * | 11/1965 | Johnson | 123/236 |
| 3,312,201 A | * | 4/1967 | Glasoe | 123/241 |
| 4,848,296 A | * | 7/1989 | Lopez | 123/242 |
| 6,368,089 B1 | * | 4/2002 | Frolik | 418/138 |

FOREIGN PATENT DOCUMENTS

| | | | | |
|---|---|---|---|---|
| CH | 622 059 | * | 3/1981 | 123/243 |
| FR | 2 590 932 | * | 6/1987 | 418/138 |
| GB | 2 075 601 A | * | 11/1981 | 418/138 |

* cited by examiner

Primary Examiner—Thomas Denion
Assistant Examiner—Thai-Ba Trieu
(74) Attorney, Agent, or Firm—Stephen J. Stark; Miller & Martin LLP (57) ABSTRACT

A new mechanical movement consisting of a main stationary cylinder into which there is a rotary cylinder configured to rotate about a fixed rotor axis, and through which a certain number of vanes are anchored at the center of the main cylinder. The vanes slide in and out of the rotary cylinder by means of wigglets since the internal rotary cylinder is off-center of the main cylinder. As the internal cylinder rotates the space between two adjacent vanes increase or decrease creating a vacuum on one side of the main cylinder and a compression on the other side. This mechanism may be configured as a four cycle internal combustion engine, a steam engine high pressure water motor a compressor or a vacuum pump.

20 Claims, 13 Drawing Sheets

ROTARY MACHINE USED AS A FOUR-CYCLE ROTARY COMBUSTION ENGINE, A COMPRESSOR, A VACUUM PUMP, A STEAM ENGINE AND A HIGH PRESSURE WATER MOTOR

BACKGROUND OF THE INVENTION

1. Field of the Invention

The present invention relates to internal combustion engines that utilize gasoline, diesel fuel, propane, natural gas, or any other combustible liquid or gas to produce power. Also, the same rotary movement can be used for other mechanical applications.

2. Description of Related Art

Some existing engines that utilize those liquids or gasses to produce power consist of pistons that by means of a crank shaft go up and down of cylinders, and other engines consist of a heart-shaped rotor that turns around inside a trochoidal chamber.

SUMMARY OF THE INVENTION

The present invention does not have pistons that go up and down nor a rotor that shakes in side a trochoidal chamber, both of which rob a good portion of the power produced by the fuel.

The present invention consists of a rotor that turns inside a master cylinder which is the main body of the engine and through the rotor there are some vanes that slide in and out of it be cause the rotor is located off-center of the master cylinder.

As a consequence any two of those adjoining vanes produce a cavity that increases and decreases as the rotor turns.

The accompanying drawings, which are incorporated in and constitute part of the specifications, illustrate several embodiments of the invention and together with the descriptions, serve to explain the principles of the invention.

DETAIL DESCRIPTION OF THE PREFERRED EMBODIMENTS

Reference will now be made in detail to the preferred embodiments of the invention, one or more examples of which are illustrated in the accompanying drawings. Each example is provided by way of explanation of the invention, not for limitation on the invention. In fact, it will be apparent to those skilled in the art that modifications and variations can be made to the present invention without departing from the scope or spirit thereof The present invention is concerned with an internal combustion engine that has much less moving parts than a conventional piston-cylinder engines. It does not have pistons, it does not have connecting rods, crank shaft, nor valve lifters, all of which produce vibration and consume a good portion of the fuel used. This invention consist of one cylinder which is the main body of the engine, and inside that cylinder there is a hollow rotor that turns off-center of it. That rotor has some longitudinal round openings though which same number of vanes slide in and out of it, and since those vanes are anchored to the epicenter of the cylinder and extend to touch it, as the rotor turns any two of those contiguous vanes create a cavity between a rotor and the cylinder and such cavity expands and contracts as the rotor turns, therefor performing the four cycles of intake, compression, power, and exhaust as a common four cycle piston engine.

Figure 1:
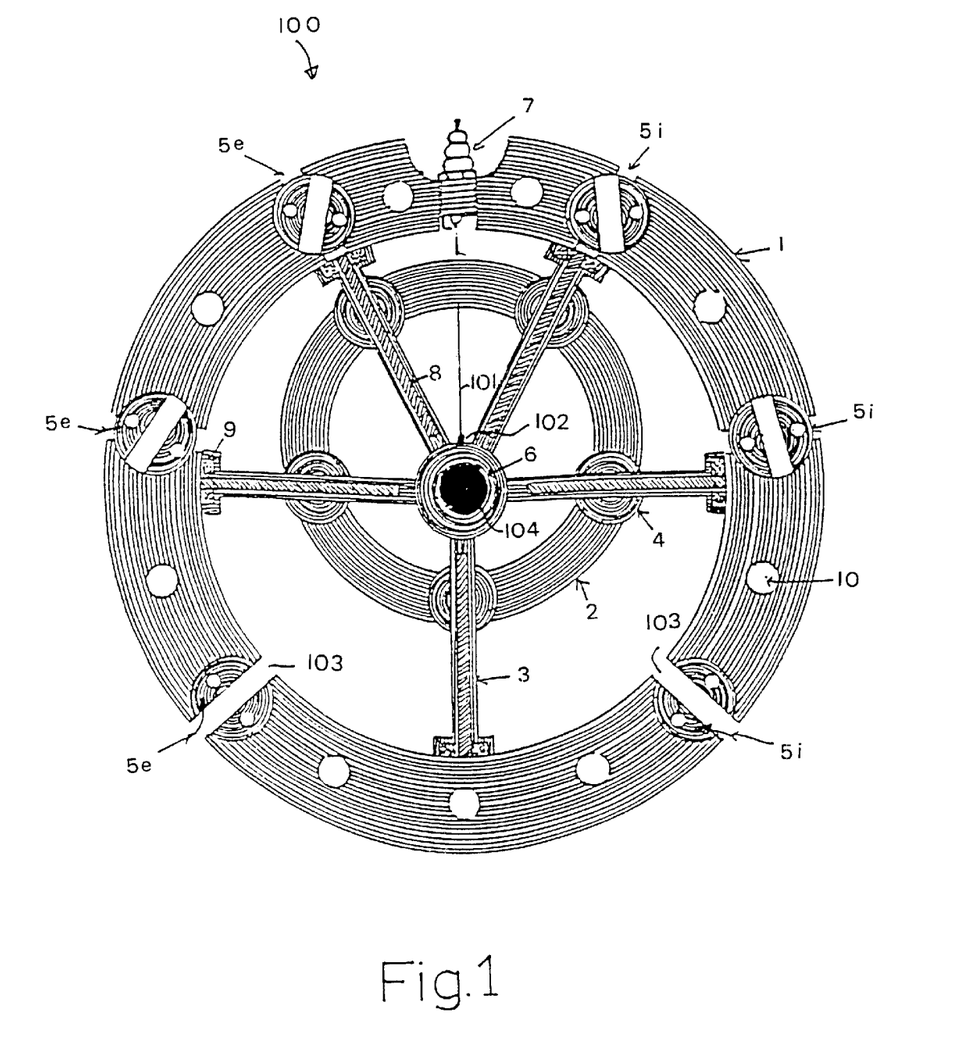
FIG. 1 is a radial cross-section of the engine, showing the main parts of the engine.

Accordingly, FIG. 1 shows a radial cross-section of the engine 100 which shows the main cylinder 1 in which are longitudinal openings 103 in which rotary valves 5 turn, three for intake 5i and three for exhaust 5e. The vanes are anchored at the center of the main cylinder by a longitudinal rod 6 and extend through the rotor 2 by means of two wigglets 4 until they touch the inside of the main cylinder 1. As the rotor turns clockwise, two of those vanes 3 in alternate order create a vacuum that will be filled with the vaporized fuel through the three valves 5i until maximum capacity and past that point the combustible will be compressed until it reaches the minimum capacity, or volume, 11 and at that point the compressed gas will be ignited by one or more spark plugs 7 generating the power cycle until the two vanes reach the maximum capacity and past that point the burnt gasses will exhaust through the tree exhaust valves 5e. The minimum capacity 11 occurs along the first radial 101 which extends from the center of longitudinal rod 6 along a radius to the circumference of the cylinder 1 as it passes through the rotor axis 102. In the main cylinder are several longitudinal holes 10 through which a coolant should be circulated and the placement and size of those holes should be determined by trial and error based on production.

Figure 2:
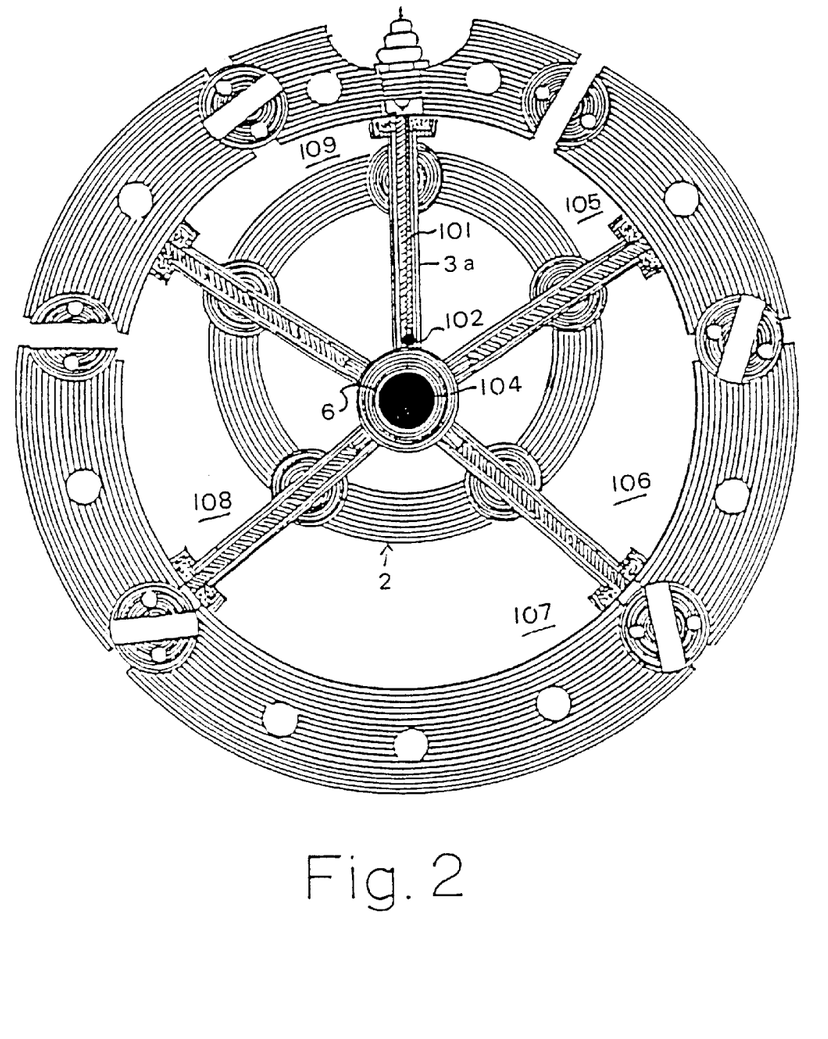
FIG. 2 is another view of the cross-section after the rotor has turned 36 degrees to show maximum cavity between two adjoining vanes.

FIG. 2 shows the same cross-section as in FIG. 1 after the rotor 2 has turned 36 degrees clockwise about rotor axis 102 to show the maximum capacity, or volume of cavity 107 and the alternate firing order of chambers 105, 106, 104, 108, 109. First vane 3a is aligned along first radial 101 in this illustration.

Figure 3:
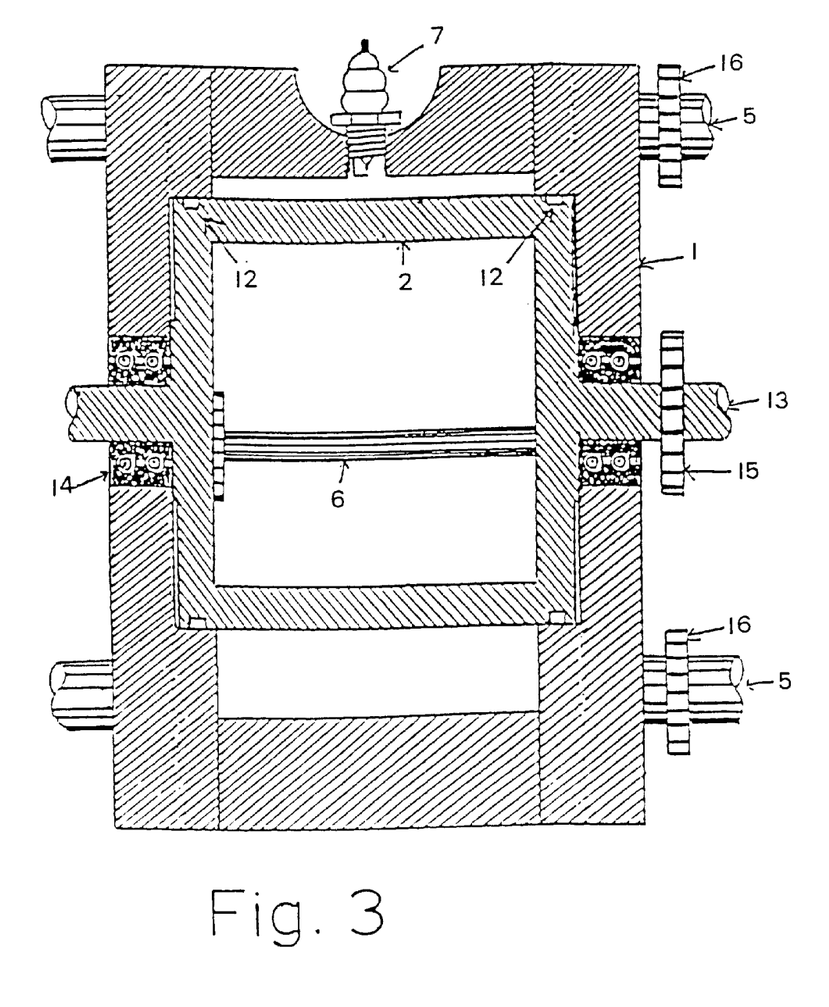
FIG. 3 is a longitudinal cross-section showing how the rotor is located off-center main cylinder

FIG. 3 shows a longitudinal cross-section of the main cylinder 1 and the off-center position of the rotor 2 inside the main cylinder 1. It also shows the location of the longitudinal rod 6 at the epicenter of cylinder 1 which anchors the vanes 3. The rotor 2 is sealed inside the cylinder 1 by two rings 12 and supported in place by the main shaft 13 which, by means of a sprocket 15 will turn the six valves 5 that have attached sprockets 16 by means of a chain that will be illustrated later. The main shaft 13 is maintained in place by means of ball bearings 14 or roller bearings or any other type of bearings to be lubricated in any conventional way. The main shaft 13 rotates about the rotor axis 102.

Figure 4:
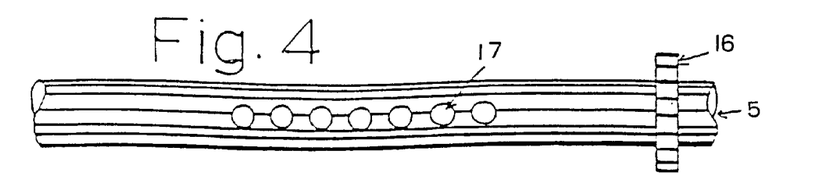
FIG. 4 is a rotary valve to be used for intake and exhaust.

FIG. 4 Shows several round holes 17 through the valves 5 that permit the intake of combustible gasses in the intake cycle and allow the gassed produced by combustion to exit the cylinder in the exhaust cycle. It also illustrates the sprockets 16 that will make the valves rotate.

Figure 5:
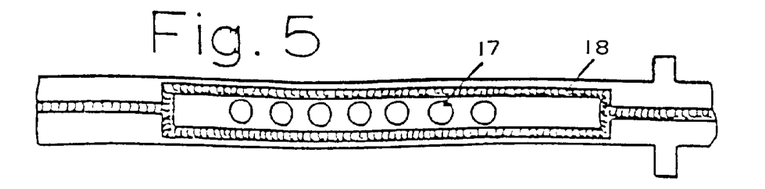
FIG. 5 is a longitudinal cross-section of the valves to illustrate the passage of a coolant through the valves.

FIG. 5 is a longitudinal cross-section of a valve 5 to show the way to cool them by means of a passage 18 above and below the holes 17.

Figure 6:
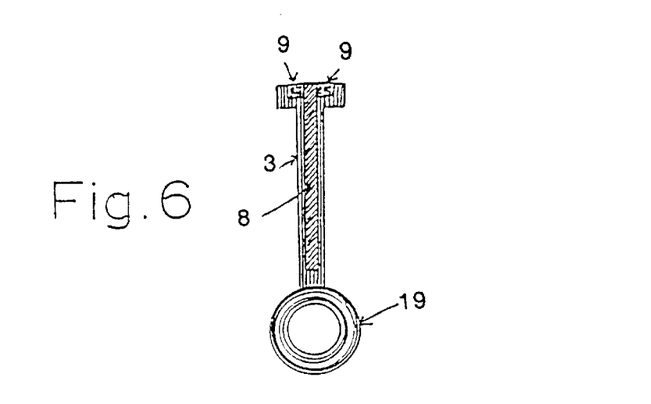
FIG. 6 is an end view of a vane.

FIG. 6 is an end view of a vane 3 that shows the lateral seal 8 against both ends of the inside of the rotor 2 and the seals 9 at the top of the vanes 3 against the round portion of the rotor 2. The vanes 3 are anchored at the epicenter 104 of the cylinder 1, or cylinder axis, by means of rings 19.

Figure 7:
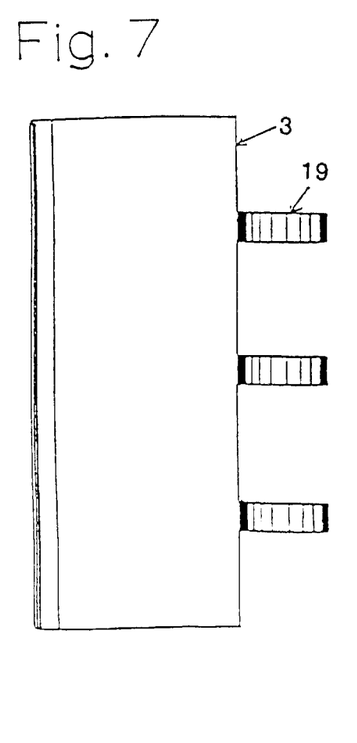
FIG. 7 is a side view of a vane.

FIG. 7 is a lateral view of a vane 3 to which three rings 19 are attached to be anchored at the epicenter 104 of the main cylinder 1.

Figure 8:
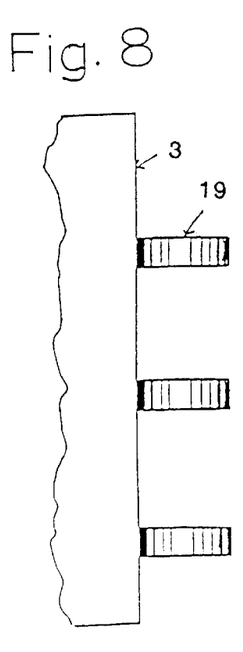
FIG. 8 is the same view with different position of the anchors that should be reversed.
Figure 9:
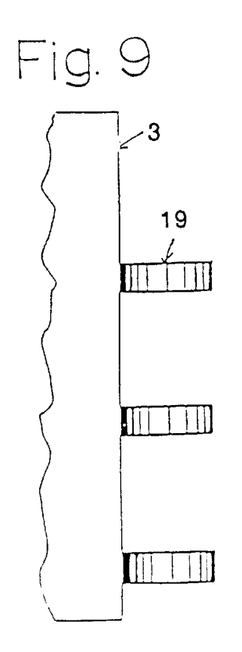
FIG. 9 is the same view with different position of the anchors that should be reversed.

FIGS. 8 and 9 show only a portion of the vanes 3 with the position of the rings 19 attached to them so two of each could be flipped over. With one vane 3 as in FIG. 7, two as in FIG. 8 and two as in FIG. 9, all the fifteen anchor rings 19 will interlock around a central pin illustrated as longitudinal rod 6 to make it a five vanes rotary engine.

Figure 10:
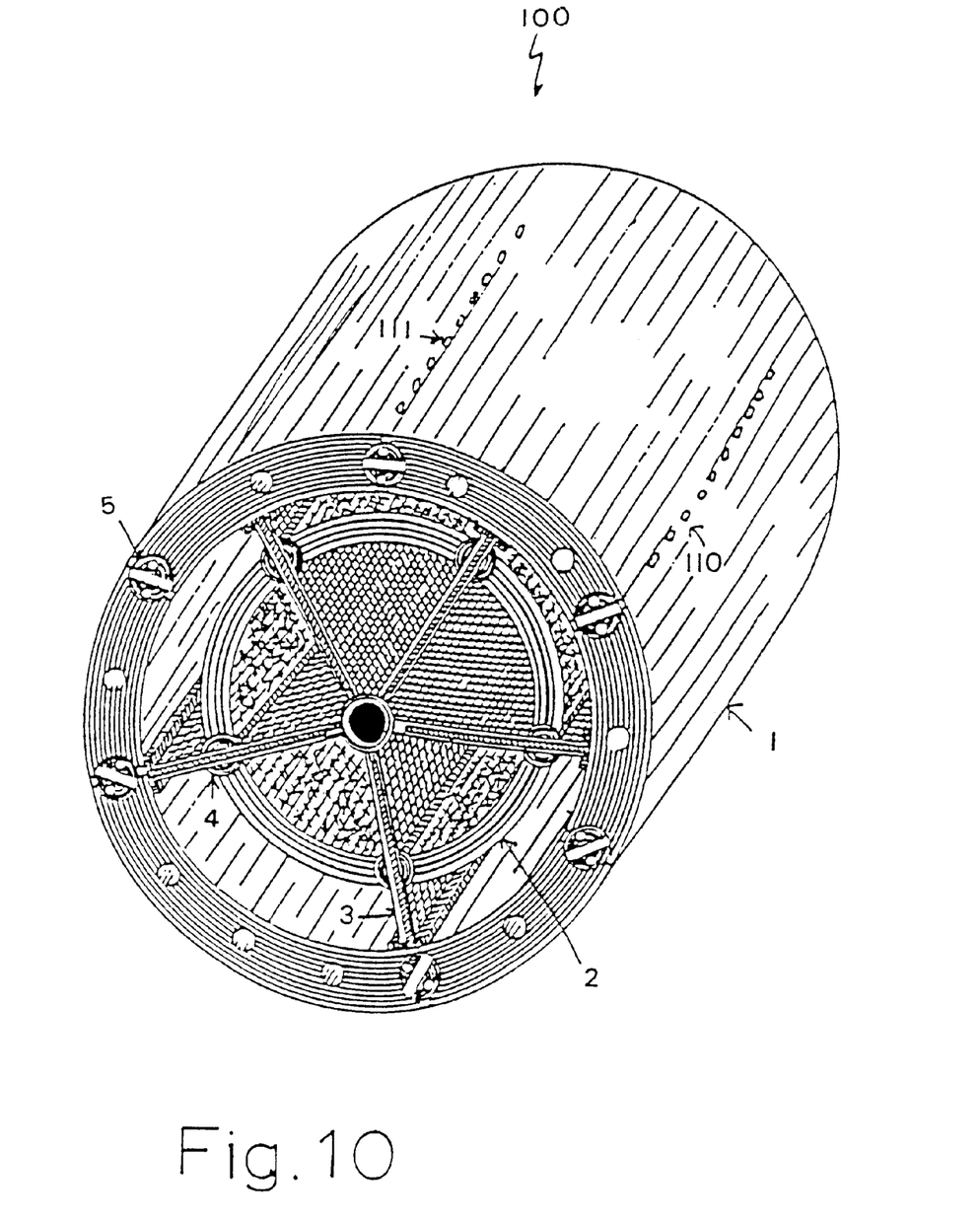
FIG. 10 is a perspective view from one end of the engine to show the position of the vanes sliding though it and touching the inside of the main cylinder to create the cavities.

FIG. 10 is an open end perspective view of the engine showing the main cylinder 1 which is the core of the engine, the rotor 2 which will be made to turn by the vanes 3 and the wigglets 4 that permit the vanes 3 to slide in and out through the rotor 2 and the valves 5 that rotate to either open to permit the fuel in or exhaust gasses out or close to compress the fuel until it is ignited and cause the power stroke. The intake openings 110 are for the fuel to get into the cylinder. The fuel should be channeled to these openings in any conventional way. The exhaust openings 111 are for the combustion gasses to get out. The exhaust gasses should be channeled out in any conventional way.

Figures 11, 12, 13, 14:
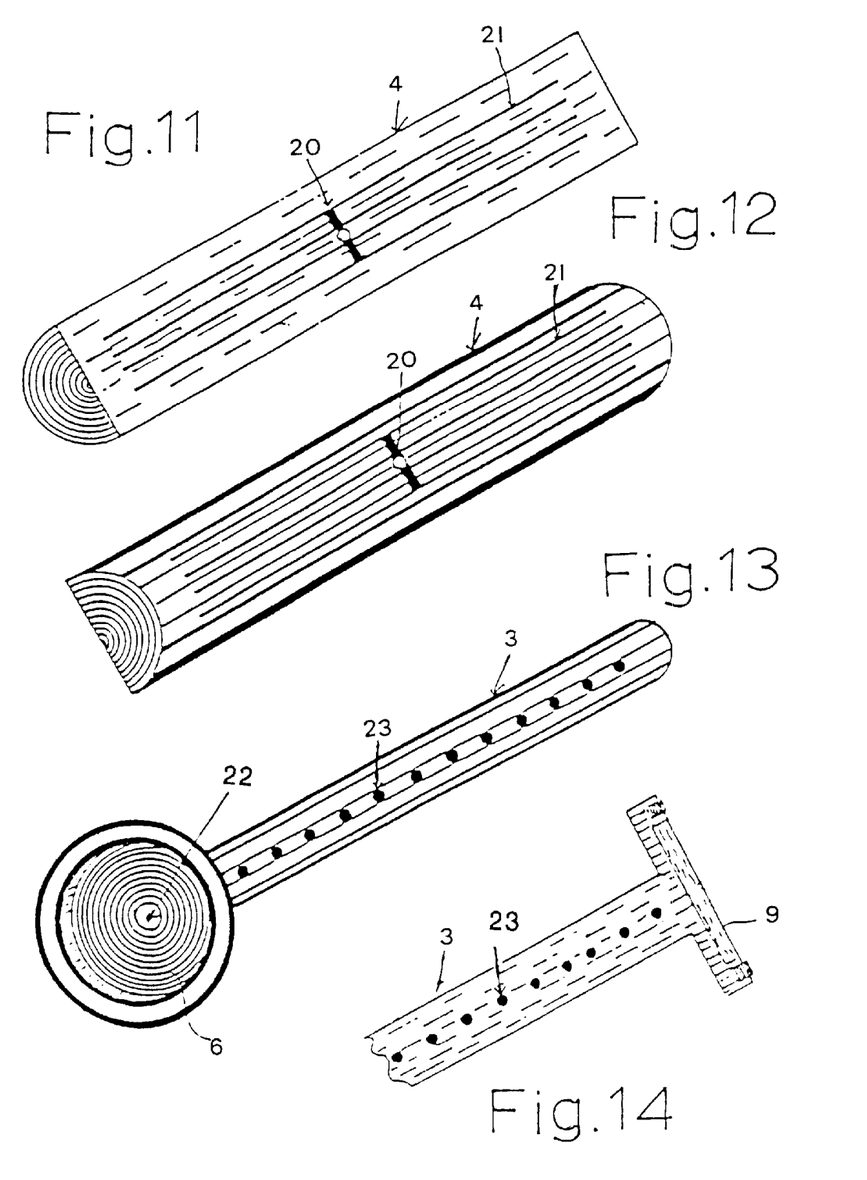
FIG. 11 is the flat side of the wigglets.
FIG. 12 is the round side of the wigglets.
FIG. 13 is the shaft to which the vanes are anchored.
FIG. 14 is a longitudinal cross-section of the shaft to illustrate the seal for lubrication.

FIG. 11 is the flat side of the wigglets 4 showing where the lubricating fluid gets in at inlet 20 and tiny grooves 21 to let the lubricating oil to seep through.

FIG. 12 is the round side of the wigglets 4 to show where the lubricating oil enters to seep thru 20 to seep thr[u]ough tiny grooves 21.

FIG. 13 is the anchor rod 6 of the vanes 3 to show where the lubricating oil enters through the center (22) and comes out of transverse holes 23 to lubricate the anchor rings.

FIG. 14 is a longitudinal cross-section of the vane 3 mainly to show seal 9 which provides a tight seal against the inside of the cylinder 1.

Figures 15, 16:
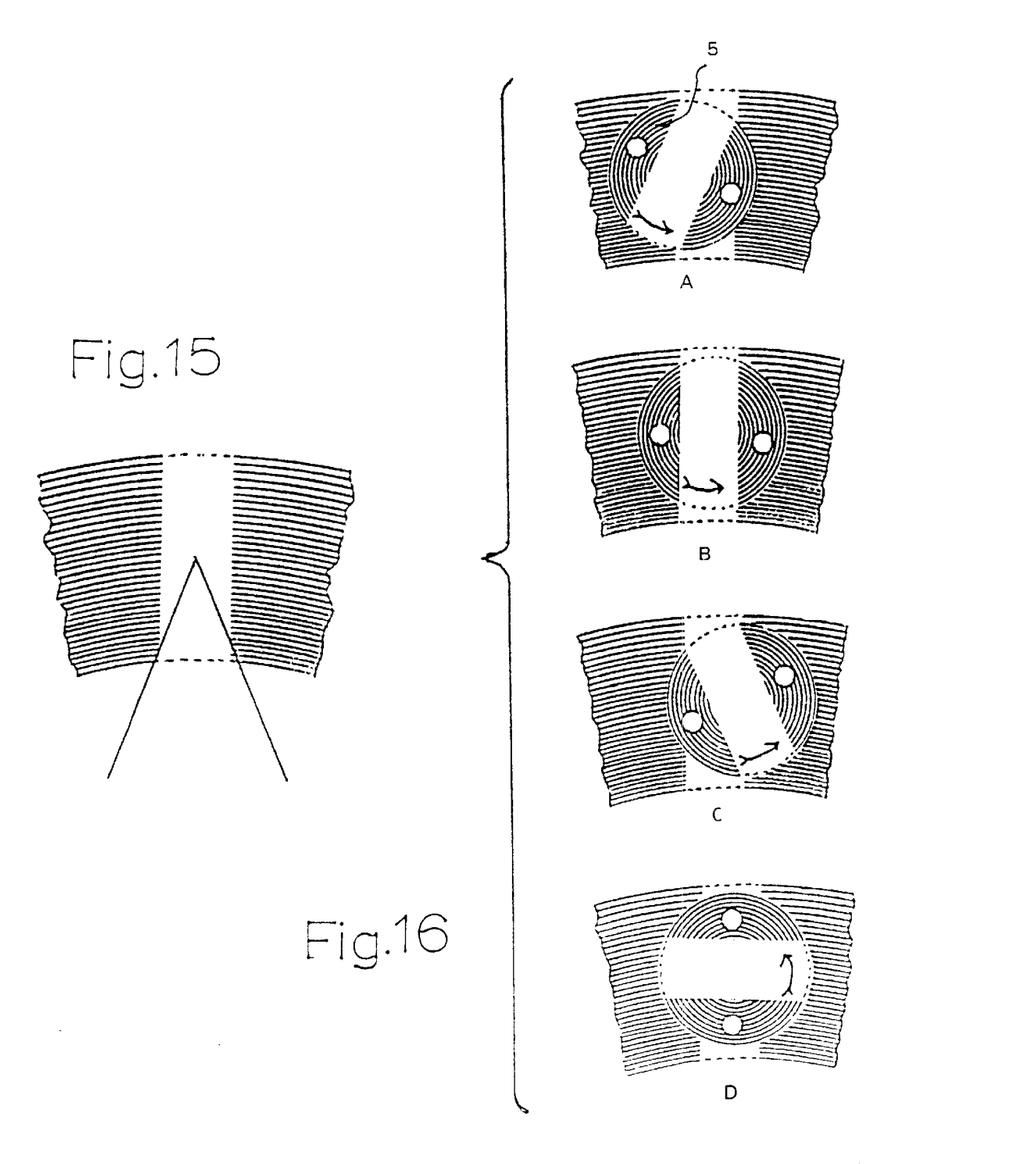
FIG. 15 is an illustration of the valves openings.
FIG. 16 is an illustration of the valves openings as they rotate 90 degrees.

FIG. 15 is a cross-section of the master cylinder when a valve is fully open.

FIG. 16 shows the rotation of the valves 5 as they open and close. On position the valve 5 is closed and will begin to open. As it rotates to position B it will have rotated 45 degrees and will be totally open. As it rotates to position C it will have rotated 90degrees and the close cycle begins. When it reaches position D will have rotated 135 degrees and is in the closed cycle. When it has rotated 180 degrees will be back to position 1.

Figure 17:
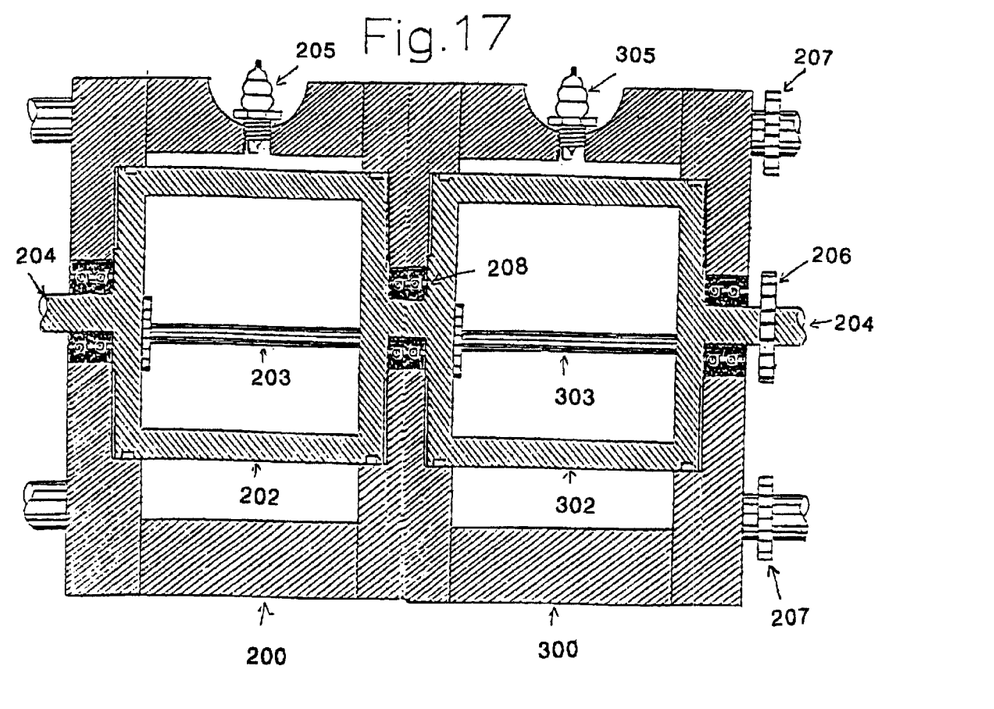
FIG. 17 shows two engines coupled in tandem.

FIG. 17 shows two engines put together in tandem. Two cylinders 200,300, two rotors 202,302, two center anchors 203,303, two spark plugs 205,305, only one drive shaft 204, twice the number of vanes (not shown) only one driving sprocket 206, same number of valves and sprockets 207 and only one extra bearing 208.

Figure 18:
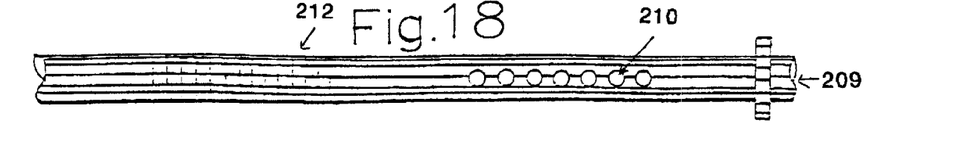
FIG. 18 shows a valve for two engines coupled in tandem.

FIG. 18 is a valve 209 for two engines in tandem to provide intake or exhaust for both. The openings 210 are serving one engine and the openings 212 are serving the other engine and are perpendicular to openings 210.

Figure 19:
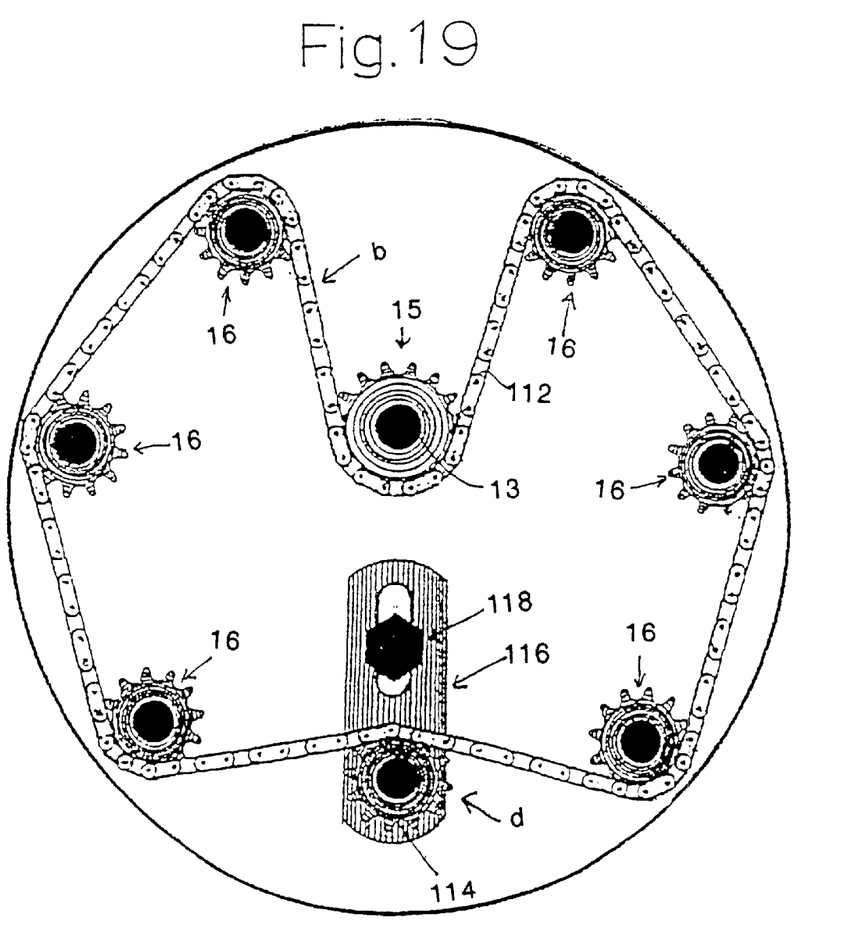
FIG. 19 shows how the main sprocket wheel mounted on the main shaft make turn the sprockets mounted on the valves to make them turn.

FIG. 19 show the rotating mechanism to make the valves 5 open and close. The sprocket 15 is attached to the main shaft 13 and move a chain 112 which engages sprockets 16a–16f that are attached to the valves to make them rotate. Said chain goes through idle sprocket 114 that is attached to sliding plate 116 and secured in place with bolt 118 when the proper tension of the chain 112 is obtained. The turn ratio of sprocket 15 to sprockets 16a–f is as follows: when sprocket 15 turns 72 degrees sprockets 16a–f turn 90 degrees. To accomplish this, assuming this is a 5-vanes motor, sprocket 15 has 15 teeth and sprockets 16a–f have 12 teeth.

Figure 20:
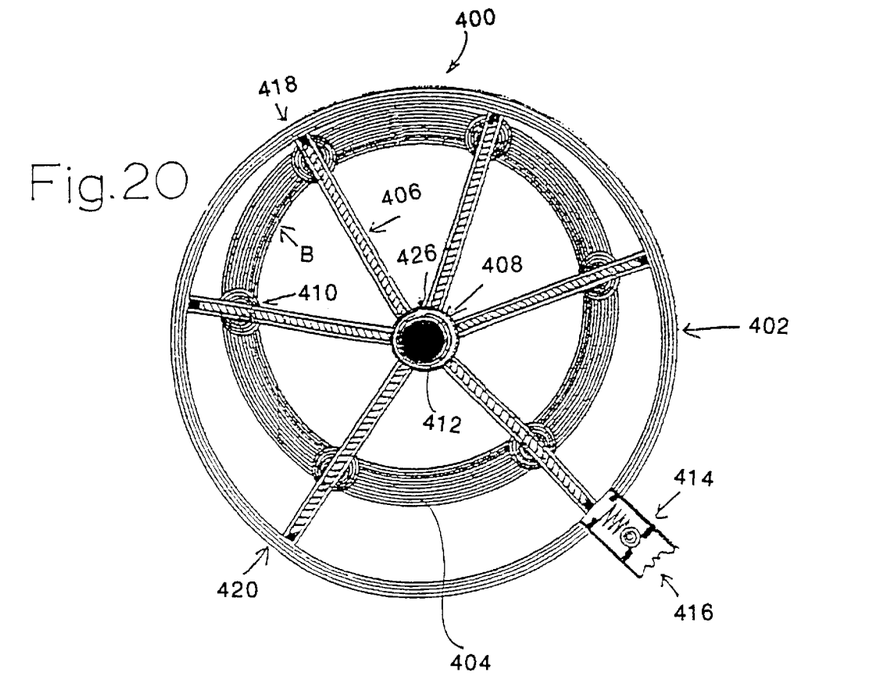
FIG. 20 shows how the same mechanism can be used as a vacuum pump.

FIG. 20 is a vacuum pump 400 based on the same principle of the internal combustion engine 100 because the movement is the same but it does not have any valves. It consist of a main cylinder 402 inside which there is a rotating cylinder 404 through which a multiple number of vanes 406 anchored at 408 which is at the epicenter of 412 cylinder 402 slide in and out through wigglets 410 and in doing as the rotor 404 moves clockwise a vacuum is created between inside cylinder 402 and outside of rotor 404 and when the vanes 406 reach a point where one one-way valve 414 is located air is sucked-in creating a vacuum at point 416. The air sucked-in is expelled through radial openings on the main cylinder from points 418 to point 420. Once again, the rotor 404 rotates about rotor axis 422.

Figure 21:
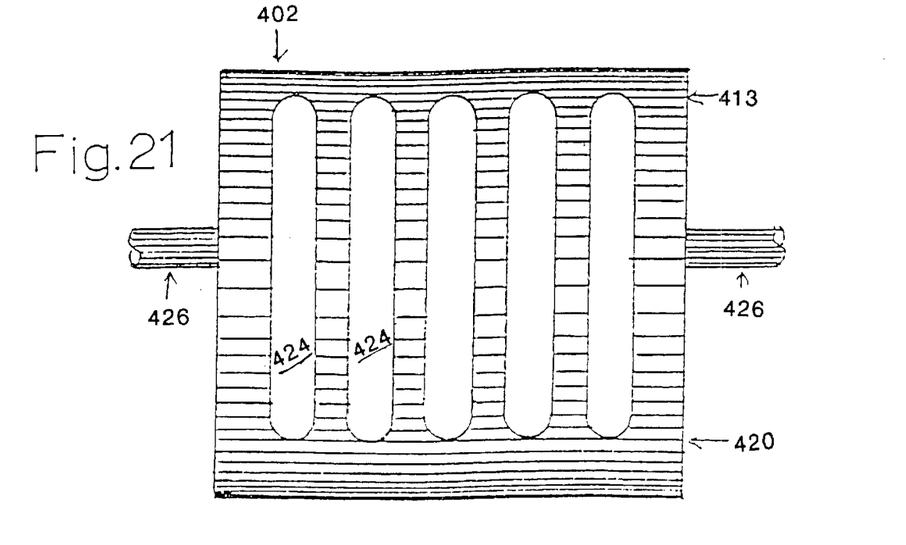
FIG. 21 show the openings needed for the vacuum pump to "breath".

FIG. 21 shows the radial openings 424 on the main cylinder 402 from point 418 to point 420 and the shaft 426 where power is applied to rotate the inner rotor 404 about rotor axis 422 (the rotation axis of shaft 426 and produce the vacuum.)

Figure 22:
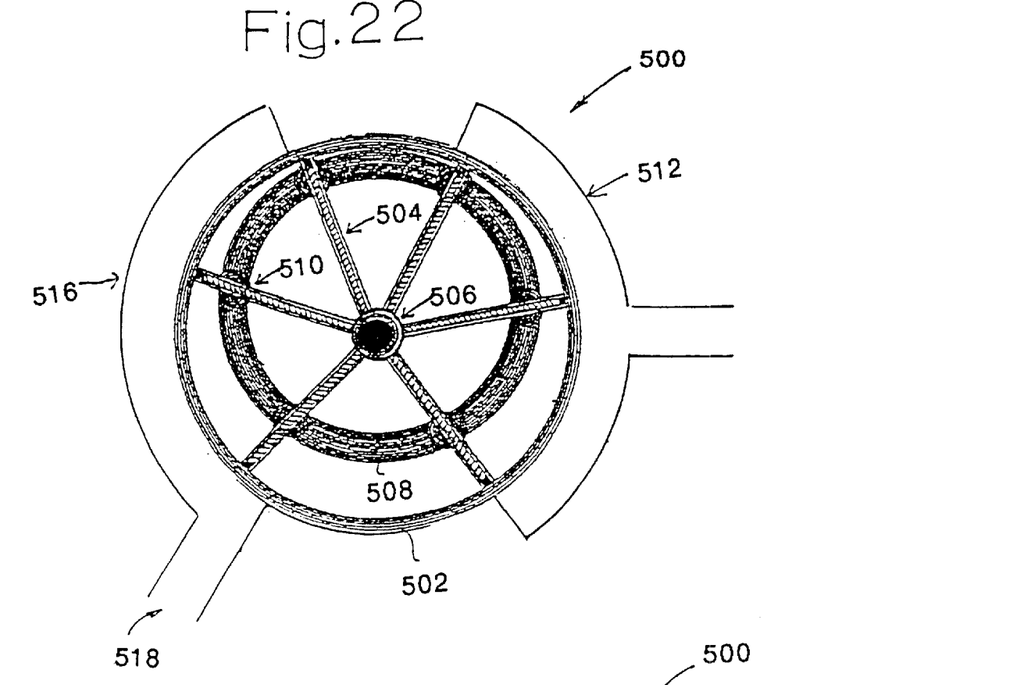
FIG. 22 shows how the same mechanism can be used as s steam engine.

FIG. 22 is a steam engine 500 consisting in a main cylinder 502 into which several vanes 504 that are anchored at the center point 506 and slide in and out of a rotor 508 through wigglets 510 to touch the inside of cylinder 502. On one side of the cylinder 502 is a shroud 512 that carries the steam through radial openings 514 on the main cylinder 502 and the steam will hit the vanes 504 and will make the rotor 508 move forward clockwise. On the other side of the engine 500 there is another shroud 516 over the radial openings 514 to let escape the unused steam and water at collecting point 518.

Figure 23:
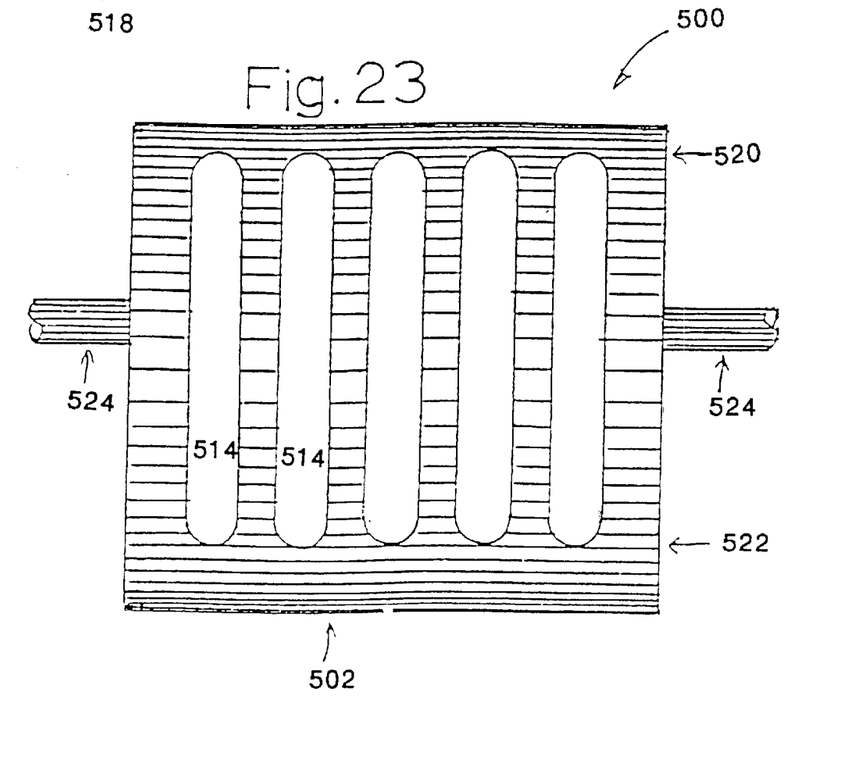
FIG. 23 shows intake and exhaust of a steam engine without valves.

FIG. 23 is a side view of the engine 500 without the shroud to show the radial openings 514 from point 520 to point 522 and the shaft 524 to harness the power produced by the steam.

Figure 24:
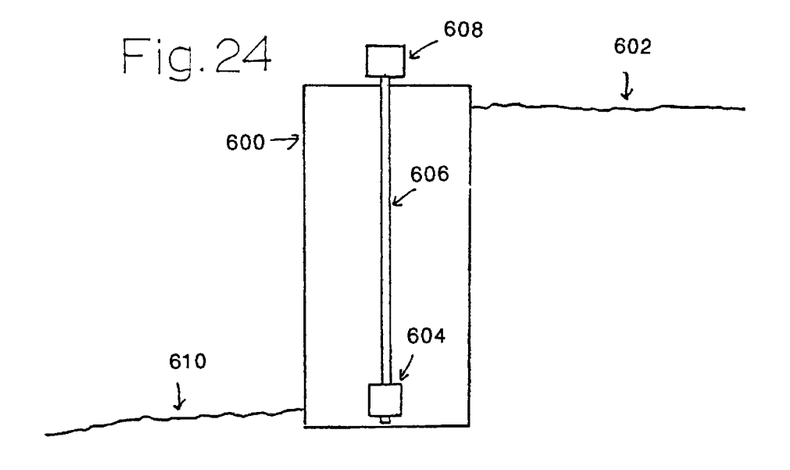
FIG. 24 shows how the same mechanism can be used on dams to move the generators.

FIG. 24 is a cross-section of a power generating dam 600. A water reservoir 602 is created by the dam 600. A turbine 604 is moved by the high pressure of the water and the vertical shaft 606 connects the turbine with the generator 608 to produce power. The used water 610 is discharged to the river.

Figure 25:
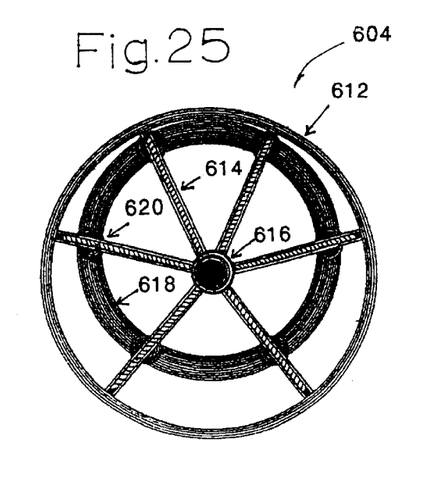
FIG. 25 is a top view of the mechanism as mounted at the bottom of the dam.

FIG. 25 is a high pressure water motor 604 consisting in an outer cylinder 612 and inside it are several vanes 614 anchored at the center 616 and sliding through rotor 618 by means of wigglets 620 and extending until they touch the inside or cylinder 612. On the night side of the illustrated cylinder 612 there are some radial openings 622 that permit the high pressure water to enter cylinder 612 and hitting the vanes 614 that will force the rotor 618 to move clockwise to produce power.

On the left side of the illustration there are also radial openings 614 that discharge the used water to the river.

Figure 26:
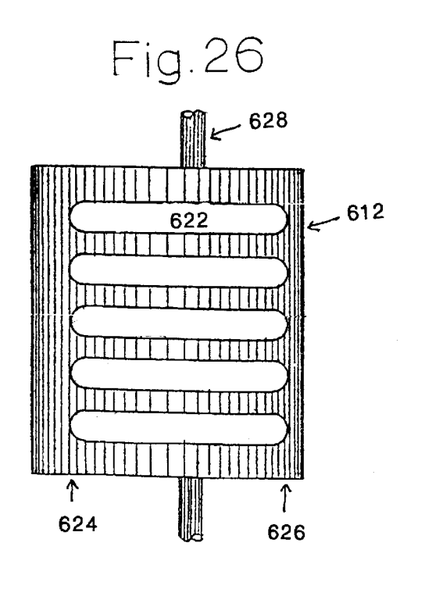
FIG. 26 is a side view showing the openings for the water to get in and to discharge it down river after it made the vanes do their work.

FIG. 26 is a side view of main cylinder 612 to show the radial openings 622 from point 624 to point 626 and the power shaft 628 to be used to turn the power generator 608 on top of the dam 600.

Figure 27:
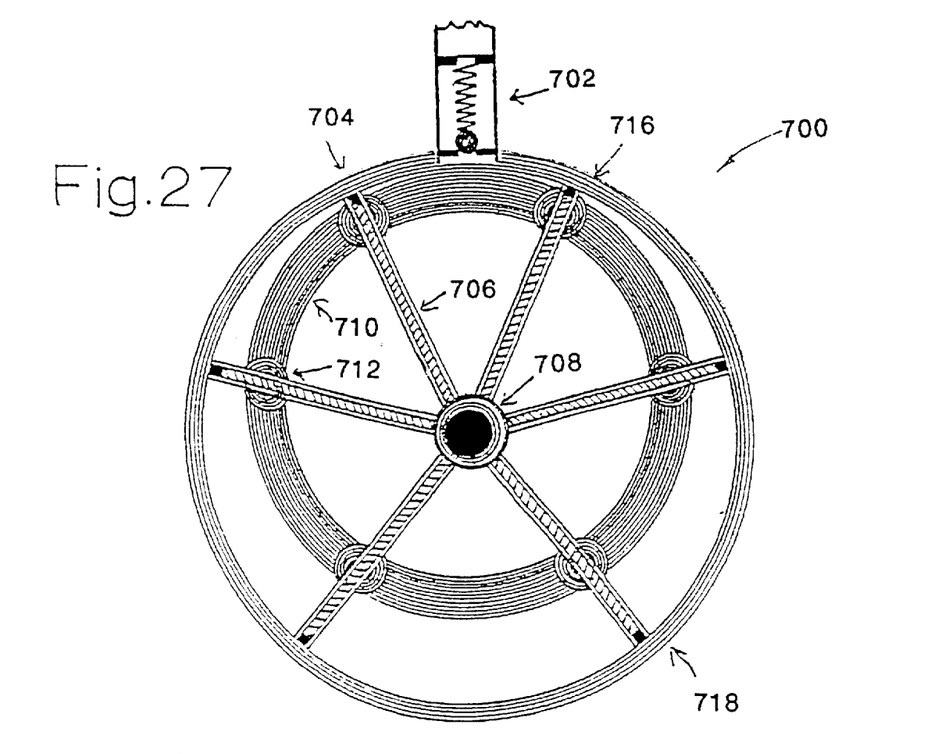
FIG. 27 shows a mechanism as a compressor.

FIG. 27 is a compressor 700 without pistons or diaphragms and only one one-way valve 702. It consists of a cylinder 704 and inside it are several vanes 706 anchored at a center point 708 and sliding through rotor 710 through wigglets 712 and touching the inner side of the rotor 710. There are some radial openings 714 on cylinder from point 716 to point 718. As power is applied to make the rotor 710 move clockwise, air will be sucked through the radial openings 714 and when the vanes 706 reach point 718 the compression cycle will begin and the compressed air will exit through one one-way valve 702 to a holding tank or to any system requiring compressed air.

Figure 28:
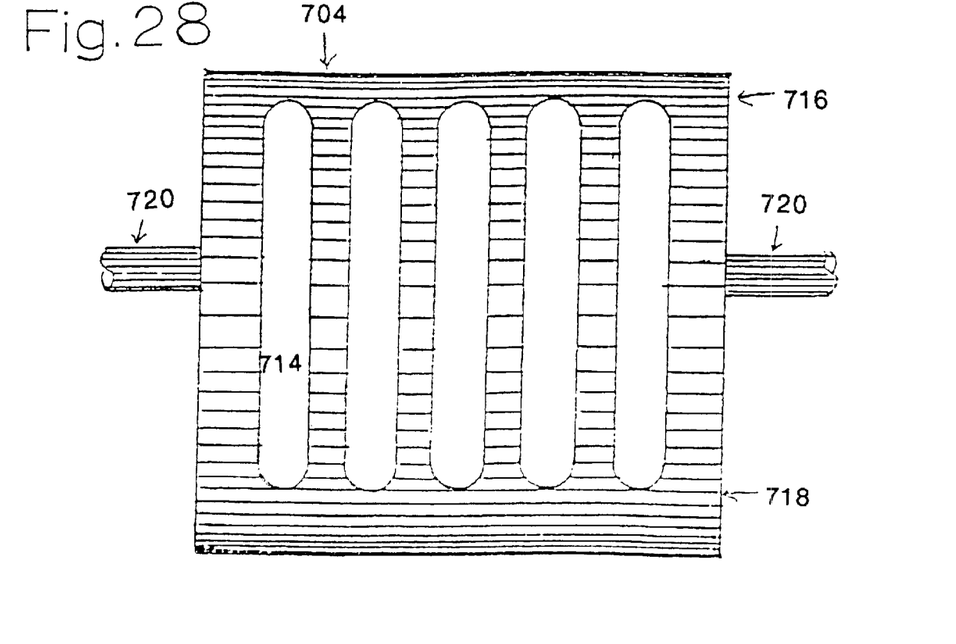
FIG. 28 is a side view of the mechanism of FIG. 27.

FIG. 28 show the right side of cylinder 704 to see the radial openings 714 that go from point 716 to point 718 and the shaft 720 where power is connected to move the inside rotor 710.

While preferred embodiments of the inventions have been described above, it is to be understood that any and all equivalent realizations of the present inventions are included within the scope and spirit thereof. Therefore, the embodiments depicted are presented by way of example only and are not intended as limitations upon the present inventions. While particular embodiments of the inventions have been described and shown, it will be understood by those with ordinary skill in the art that the present inventions are not limited thereto since many modifications can be made. Thus, it is contemplated that any and all such embodiments are included in the present inventions as may fall within the literal or equivalent scope of the appended claim.

What is claimed is:

1. A rotary engine comprising:
    a hollow cylinder having a cylinder axis with a longitudinal rod extending there along, and an interior surface;
    a rotor mounted within the cylinder, said rotor rotatable about a rotor axis parallel to the cylinder axis of the cylinder, said rotor axis non-colinear with the cylinder axis, and said rotor axis fixedly positioned relative to the cylinder axis and located along a first radial extending from the rotor axis to the interior surface of the cylinder;
    a main shaft connected to the rotor, said main shaft located along the rotor axis;
    a plurality of vanes connected to the longitudinal rod and extending to the interior surface of the cylinder, said vanes each having a vane axis, wherein adjacent vanes of the plurality of vanes and the interior surface of the cylinder define cavities respectively, said cavities having a volume, and the volume of one of the cavities intersected by the first radial is the smallest of the cavity volumes;
    a plurality of wigglets cooperating with the plurality of vanes, each of said wigglets connected to the rotor and receiving a respective vane at the rotor and allowing the vane to extend through the wigglet while allowing at least one of the vane and the rotor to move along the vane axis and allowing relative rotation of the vane relative to the rotor at the wigglet; and
    a plurality of valves connected to the cylinder for selectively controlling fluid flow to and from the cavities.

2. The rotary engine of claim 1 further comprising an odd number of vanes.

3. The engine of claim 1 further comprising at least one spark plug providing a spark to one of the cavities when located proximate to the radian.

4. The engine of claim 3 wherein the one of the cavities is intersected by the first radian when in communication with the spark.

5. The engine of claim 1 wherein the vanes have an extended and a contracted configuration with the extended configuration having a greater length than the contracted configuration.

6. The engine of claim 5 wherein a first vane is in the contracted configuration when the cylinder axis and the wigglet corresponding with the first vane is aligned along a second radian of the cylinder.

7. The engine of claim 6 wherein the first vane is in the extended configuration when the cylinder axis and the wigglet corresponding with the first vane are not aligned along the second radian of the cylinder.

8. The engine of claim 1 wherein the valves are rotary valves.

9. The engine of claim 8 further comprising a valve control assembly, said valve control assembly comprising:
    valve sprockets coupled respectively to each of the valves;
    a chain connecting the valve sprockets to a drive sprocket coupled to the main shaft, wherein rotation of the main shaft rotates the drive sprocket which drives the chain to rotate the valve sprockets.

10. The engine of claim 9 wherein the valve sprockets are symmetrical about the first radian.

11. The engine of claim 9 further comprising an idle sprocket, said idle sprocket contacting the chain and selectively applying a desired tension to the chain.

12. The engine of claim 9 wherein the drive sprocket has a turn ratio relative to the valve sprockets of 0.8.

13. The engine of claim 1 wherein the vanes are connected to the longitudinal rod with a plurality of rings.

14. The engine of claim 13 wherein the rings interlock to form an oil chamber external to the longitudinal rod.

15. The engine of claim 14 wherein the vanes are further comprised of slides connected to the rings, said slides received within anchor rods, and at least one of said slides and anchor rods having holes in fluid communication with the oil chamber.

16. The engine of claim 1 wherein a pair of wigglets are respectively provided for each of the vanes at the rotor, each of said wigglets having a flat side contacting the vane passing therethrough.

17. A rotary engine comprising:
- a hollow cylinder having a cylinder axis with a longitudinal rod extending there along, and an interior surface;
- a rotor mounted within the cylinder, said rotor rotatable about a rotor axis parallel to the cylinder axis of the cylinder, said rotor axis non-colinear with the cylinder axis, and said rotor axis fixedly positioned relative to the cylinder and located along a first radial extending from the cylinder axis to the interior surface of the cylinder;
- a main shaft connected to the rotor, said main shaft located along the rotor axis;
- a plurality of vanes connected to the longitudinal rod and extending to the interior surface of the cylinder, said vanes each having a vane axis, wherein adjacent vanes of the plurality of vanes and the interior surface of the cylinder define cavities respectively, said cavities having a volume, and the volume of one of the cavities intersected by the first radial is the smallest of the cavity volumes;
- a plurality of wigglets cooperating with the plurality of vanes, each of said wigglets connected to the rotor and receiving a respective vane at the rotor and allowing the vane to extend through the wigglet while allowing at least one of the vane and the rotor to move along the vane axis and allowing relative rotation of the vane relative to the rotor at the wigglet; and
- at least one first radial opening on the cylinder proximate to the first radial and at least one second radial opening substantially opposite the first radial opening.

18. A high pressure water motor exactly the same as the steam engine to be used in power dams using the high pressure water at the bottom of the reservoir to enter the cylinder thru radial openings on one side and discharge the water to the river thru radial openings on the other side.

19. A rotary engine comprising:
- a hollow cylinder having a cylinder axis with a longitudinal rod extending there along, and an interior surface;
- a rotor mounted within the cylinder, said rotor rotatable about a rotor axis parallel to the cylinder axis of the cylinder, said rotor axis non-colinear with the cylinder axis, and said rotor axis fixedly positioned relative to the cylinder axis and located along a first radical extending from the cylinder axis to the interior surface of the cylinder;
- a main shaft connected to the rotor, said main shaft located along the rotor axis;
- a plurality of vanes connected to the longitudinal rod and extending to the interior surface of the cylinder, said vanes each having a vane axis, wherein adjacent vanes of the plurality of vanes and the interior surface of the cylinder define cavities respectively, said cavities having a volume, and the volume of one of the cavities intersected by the first radical is the smallest of the cavity volumes;
- a plurality of wigglets cooperating with the plurality of vanes, each of said wigglets connected to the rotor and receiving a respective vane at the rotor and allowing the vane to extend through the wigglet while allowing at least one of the vane and the rotor to move along the vane axis and allowing relative rotation of the vane relative to the rotor at the wigglet; and
- at least one radical opening on the cylinder proximate to the first radical, and at least one second radical opening spaced apart form the first radical opening.

20. A vacuum pump which is quite the opposite of the compressor. As the rotor is made to turn, the expanding cavities created by two contiguous vanes create a vacuum and when that cavity reaches the maximum point, air or gas will be sucked in thru a one-way valve and will be discharged thru radical openings to the air or, by not having radical openings for discharge, the air or gas that was sucked in will be compressed and at the point of maximum compression will exit the cylinder thru a one-way valve, creating a dual purpose pump.

* * * * *